US012550868B2

(12) United States Patent
Kosanke

(10) Patent No.: US 12,550,868 B2
(45) Date of Patent: Feb. 17, 2026

(54) WEARABLE FELINE WASTE COLLECTOR AND METHOD OF MAKING SAME

(71) Applicant: Crazy K Farm Pet and Poultry Products, LLC, Hempstead, TX (US)

(72) Inventor: Tobi Kosanke, Hempstead, TX (US)

(73) Assignee: Crazy K Farm Pet and Poultry Products, LLC, Hempstead, TX (US)

( * ) Notice: Subject to any disclaimer, the term of this patent is extended or adjusted under 35 U.S.C. 154(b) by 62 days.

(21) Appl. No.: 17/807,102

(22) Filed: Jun. 15, 2022

(65) Prior Publication Data

US 2022/0400654 A1 Dec. 22, 2022

Related U.S. Application Data

(60) Provisional application No. 63/211,293, filed on Jun. 16, 2021.

(51) Int. Cl.
*A01K 23/00* (2006.01)
*A61F 13/84* (2006.01)
*A61F 13/15* (2006.01)

(52) U.S. Cl.
CPC .... *A01K 23/00* (2013.01); *A61F 2013/15186* (2013.01); *A61F 2013/8408* (2013.01)

(58) Field of Classification Search
CPC .... A01K 23/00; A01K 27/002; A01K 13/006; A61F 13/49004; A61F 2013/15186
USPC ........................................................ 119/868
See application file for complete search history.

(56) References Cited

U.S. PATENT DOCUMENTS

| | | | | |
|---|---|---|---|---|
| 4,676,198 A | * | 6/1987 | Murray | A01K 27/002 280/801.1 |
| 4,779,573 A | * | 10/1988 | Vidal | A01K 23/00 119/869 |
| 5,146,874 A | * | 9/1992 | Vidal | A01K 23/00 119/869 |
| 5,199,383 A | * | 4/1993 | Lagana | A01K 27/006 119/858 |
| 6,941,897 B1 | * | 9/2005 | Rosales | A01K 23/00 119/868 |
| 8,851,020 B2 | * | 10/2014 | Pesale | A01K 23/00 119/869 |
| 2004/0244727 A1 | * | 12/2004 | Brewington | A01K 23/00 119/869 |
| 2006/0124076 A1 | * | 6/2006 | Tseng | A01K 23/00 119/868 |

(Continued)

*Primary Examiner* — Zoe Tam Tran
(74) *Attorney, Agent, or Firm* — Gregory L. Mayback; Mayback IP Law, P.A.

(57) ABSTRACT

A wearable feline waste collector includes a feline diaper assembly comprising a body portion comprising a front portion and a rear portion defining a diaper opening sized to at least accommodate a feline's tail, anus, and urinary outlet and having a nadir. Girth straps connected to the rear portion have respective fasteners. Shoulder straps connected to the front portion have respective fasteners. Each of the fasteners are configured to attach to any other one of the fasteners. The assembly is shaped and sized to form a removable harness for a feline. A feline diaper is attached to the diaper opening and is shaped in a pouch comprising an entry aperture and an interior pocket having a bottom that, responsive to the diaper being attached to the diaper opening and the assembly being worn by the feline, the bottom is lower to ground than the nadir.

20 Claims, 5 Drawing Sheets

(56) References Cited

U.S. PATENT DOCUMENTS

| | | | |
|---|---|---|---|
| 2007/0227466 A1* | 10/2007 | Tsai | A01K 23/00 119/868 |
| 2012/0067298 A1* | 3/2012 | Rich | A01K 23/00 119/856 |
| 2015/0034023 A1* | 2/2015 | Tseng | A01K 23/00 119/868 |
| 2015/0189859 A1* | 7/2015 | John | A01K 23/00 119/868 |
| 2015/0272713 A1* | 10/2015 | Komatsubara | A61D 99/00 604/385.09 |
| 2015/0305307 A1* | 10/2015 | Komatsubara | A01K 23/00 119/868 |
| 2018/0249681 A1* | 9/2018 | Martin | A01K 23/00 |
| 2022/0295749 A1* | 9/2022 | Mignott | A01K 23/00 |
| 2022/0346353 A1* | 11/2022 | Alexander | A01K 23/00 |

\* cited by examiner

WEARABLE FELINE WASTE COLLECTOR AND METHOD OF MAKING SAME

CROSS-REFERENCE TO RELATED APPLICATION

This application claims the priority, under 35 U.S.C. § 119, of U.S. Provisional Patent Application No. 63/211,293, filed Jun. 16, 2021; the prior application is herewith incorporated by reference herein in its entirety.

STATEMENT REGARDING FEDERALLY SPONSORED RESEARCH OR DEVELOPMENT

Not Applicable

FIELD OF THE INVENTION

The present systems, apparatuses, and methods lie in the field of feline accessories. The present disclosure relates to a diaper for a feline.

BACKGROUND OF THE INVENTION

Most indoor felines use a litter box for their waste. A number of felines, however, refuse to use the little box. Those felines that refuse to use the litter box typically are incontinent and spray and soil themselves and/or the human home in which they live.

Other diapers made specifically for felines do not work. They leak when the feline sits, causing the feline's fur to become wet with urine. These insufficient diapers enable feces to become stuck on the feline's fur, necessitating frequent changing of the diaper and cleaning of the feline. Similarly, such feline diapers do not adjust to fit all of the different sized felines.

It is desirable to improve diapers for felines to fit successfully the various body shapes while sanitarily removing and containing waste.

Thus, a need exists to overcome the problems with the prior art systems, designs, and processes as discussed above.

SUMMARY OF THE INVENTION

The systems, apparatuses, and methods described provide a wearable feline waste collector having a diaper and a diaper harness assembly and method of making same that overcome the hereinafore-mentioned disadvantages of the heretofore-known devices and methods of this general type and that provide such features with adjustability and improved removal of both urine and feces.

The wearable feline waste collector includes a body that secures to a feline and a waste collection device or pouch that connects to or is integral with the body portion. In an exemplary configuration, the waste collector body can be of fabric, enabling it to be washed easily by users. Other materials for the waste collector body include materials commonly used for pet leashes, such as, for example, leather, nylon (and other polymers), and cotton.

The feline diaper is adjustable and funnels feces and urine away from the feline into a detachable pouch. The configuration of the removable, funnel-shaped pouch allows it to compress into a closed state in response to the feline sitting down. When closed, leaks are prevented and, at the same time, the pouch maintains the feces and urine sanitarily away from the feline's body. The pouch can accommodate a variety of removable, absorbent materials to soak up the urine to prevent leaks. Such materials include, but are not limited to, cotton, paper, gels (e.g., Sodium Polyacrylate), and woven fabrics. The material of the pouch can be watertight or made to be watertight, for example, by sewing and/or heat-sealing. Exemplary materials for the pouch include, but are not limited to, cotton, laminated PUL, polyester, and vinyl, and any textile. In an alternative embodiment, the pouch can be permanently secured to the wearable feline waste collector but have a removable, inner pouch that receives and retains the waste for disposal. The inner pouch can be either disposable or washable. In an exemplary embodiment, the inner pouch can be a watertight/liquid-proof inner lining that is affixed to the outer material of the pouch, which can be any of the materials described herein (e.g., fabric). In the connected configuration, these two nested pouches are washed by the user together as a single part when desired and where the diaper is connected to the body, the three parts can be washed as a single unit.

With the foregoing and other objects in view, there is provided, a wearable feline waste collector comprising a feline diaper assembly comprising a body portion comprising a front portion and a rear portion defining a diaper opening sized to at least accommodate the tail, the anus, and the urinary outlet of the feline, the diaper opening having a nadir, right and left lower girth straps projecting away from the rear portion and having respective right and left lower girth fasteners, and right and left upper girth straps projecting away from the front portion and having respective right and left upper girth fasteners, each of the right and left lower girth fasteners and each of the right and left upper girth fasteners configured to attach to any other one of the girth fasteners, the body portion and the girth straps shaped and sized to form a removable harness for a feline, and a feline diaper attached at the diaper opening and shaped in a pouch comprising an entry aperture and an interior pocket having a bottom that, responsive to the diaper being attached to the diaper opening and the assembly being worn by the feline, the bottom is lower to ground than the nadir.

With the objects in view, there is also provided a wearable feline waste collector comprising a feline diaper assembly comprising a central body portion defining a diaper opening sized to at least accommodate the tail, the anus, and the urinary outlet of the feline, the diaper opening having a nadir, right and left girth straps projecting from the body portion and sized to wrap around a feline and removably secure thereabout, and the body portion and the girth straps are shaped and sized to form a removable harness for a feline; and a feline diaper attached at the diaper opening and shaped in a pouch comprising an entry aperture and an interior pocket having a bottom that, responsive to the diaper being attached to the diaper opening and the assembly being worn by the feline, the bottom is lower to ground than the nadir.

With the objects in view, there is also provided a wearable feline waste collector comprising a feline diaper harness comprising a rear portion defining a diaper opening sized to at least accommodate the tail, the anus, and the urinary outlet of the feline, the diaper opening having a nadir and at least a pair of straps sized to wrap laterally around a feline and removably secure thereabout, and a pouch-shaped feline diaper removably secured to the diaper opening and having interior bottom that, responsive to the diaper being attached to the diaper opening, the bottom is lower to ground than the nadir.

In accordance with another feature, the body portion is sized to extend over and follow a spine of a feline from adjacent a rear of a neck to a tail.

In accordance with a further feature, the at least one lower girth strap and the at least one upper girth strap are sized to wrap around a feline and removably secure about the feline.

In accordance with an added feature, the at least one girth strap comprises right and left lower girth straps and the at least one upper girth strap comprises right and left upper girth straps.

In accordance with an additional feature, the at least one lower girth strap and at least one upper girth strap are adjustable.

In accordance with yet another feature, the feline diaper is integral with the body portion.

In accordance with yet a further feature, the feline diaper comprises a removable, watertight, inner pouch shaped to receive and retain feline waste.

In accordance with yet an added feature, the inner pouch is at least one of disposable and washable.

In accordance with yet an additional feature, the feline diaper is removably secured to the diaper opening.

In accordance with again another feature, the diaper opening is positioned and shaped to receive therethrough a feline's tail and at least accommodate the tail, an anus, and a urinary outlet of the feline.

In accordance with again a further feature, the feline diaper has a watertight exterior.

In accordance with again an added feature, the feline diaper comprises a material selected from at least one of textile, washable fabric, leather, nylon, a polymer, polymers, laminated PUL, polyester, vinyl, and cotton.

In accordance with again an additional feature, the feline diaper is at least partly filled with a liquid absorbing material.

In accordance with still another feature, the liquid absorbing material is an odor-absorbing material.

In accordance with still a further feature, the liquid absorbing material is selected from at least one of cotton, paper, gel, Sodium Polyacrylate, and a woven fabric.

In accordance with still an added feature, the feline diaper comprises an outer pouch and a removable, watertight, inner pouch disposed in the outer pouch shaped to receive and retain feline waste therein and at least partly filled with a liquid absorbing material.

In accordance with still an additional feature, the feline diaper defines an entry aperture that, together with the interior pocket, are shaped to compress into a closed state responsive to the feline assuming a laying or sitting down position, the closed state substantially preventing interior waste from exiting the entry aperture.

In accordance with a concomitant feature, the feline diaper defines an entry aperture and is shaped to compress into a closed state responsive to the feline assuming a laying or sitting down position, the closed state substantially preventing interior waste from exiting the entry aperture.

Although the systems, apparatuses, and methods are illustrated and described herein as embodied in a wearable feline waste collector having a diaper and a diaper harness assembly and method of making same, it is, nevertheless, not intended to be limited to the details shown because various modifications and structural changes may be made therein without departing from the spirit of the invention and within the scope and range of equivalents of the claims. Additionally, well-known elements of exemplary embodiments will not be described in detail or will be omitted so as not to obscure the relevant details of the systems, apparatuses, and methods.

Additional advantages and other features characteristic of the systems, apparatuses, and methods will be set forth in the detailed description that follows and may be apparent from the detailed description or may be learned by practice of exemplary embodiments. Still other advantages of the systems, apparatuses, and methods may be realized by any of the instrumentalities, methods, or combinations particularly pointed out in the claims.

Other features that are considered as characteristic for the systems, apparatuses, and methods are set forth in the appended claims. As required, detailed embodiments of the systems, apparatuses, and methods are disclosed herein; however, it is to be understood that the disclosed embodiments are merely exemplary of the systems, apparatuses, and methods, which can be embodied in various forms. Therefore, specific structural and functional details disclosed herein are not to be interpreted as limiting, but merely as a basis for the claims and as a representative basis for teaching one of ordinary skill in the art to variously employ the systems, apparatuses, and methods in virtually any appropriately detailed structure. Further, the terms and phrases used herein are not intended to be limiting; but rather, to provide an understandable description of the systems, apparatuses, and methods. While the specification concludes with claims defining the systems, apparatuses, and methods of the invention that are regarded as novel, it is believed that the systems, apparatuses, and methods will be better understood from a consideration of the following description in conjunction with the drawing figures, in which like reference numerals are carried forward.

BRIEF DESCRIPTION OF THE DRAWINGS

The accompanying figures, where like reference numerals refer to identical or functionally similar elements throughout the separate views, which are not true to scale, and which, together with the detailed description below, are incorporated in and form part of the specification, serve to illustrate further various embodiments and to explain various principles and advantages all in accordance with the systems, apparatuses, and methods. Advantages of embodiments of the systems, apparatuses, and methods will be apparent from the following detailed description of the exemplary embodiments thereof, which description should be considered in conjunction with the accompanying drawings in which.

DETAILED DESCRIPTION OF THE EMBODIMENTS

Figure 1:
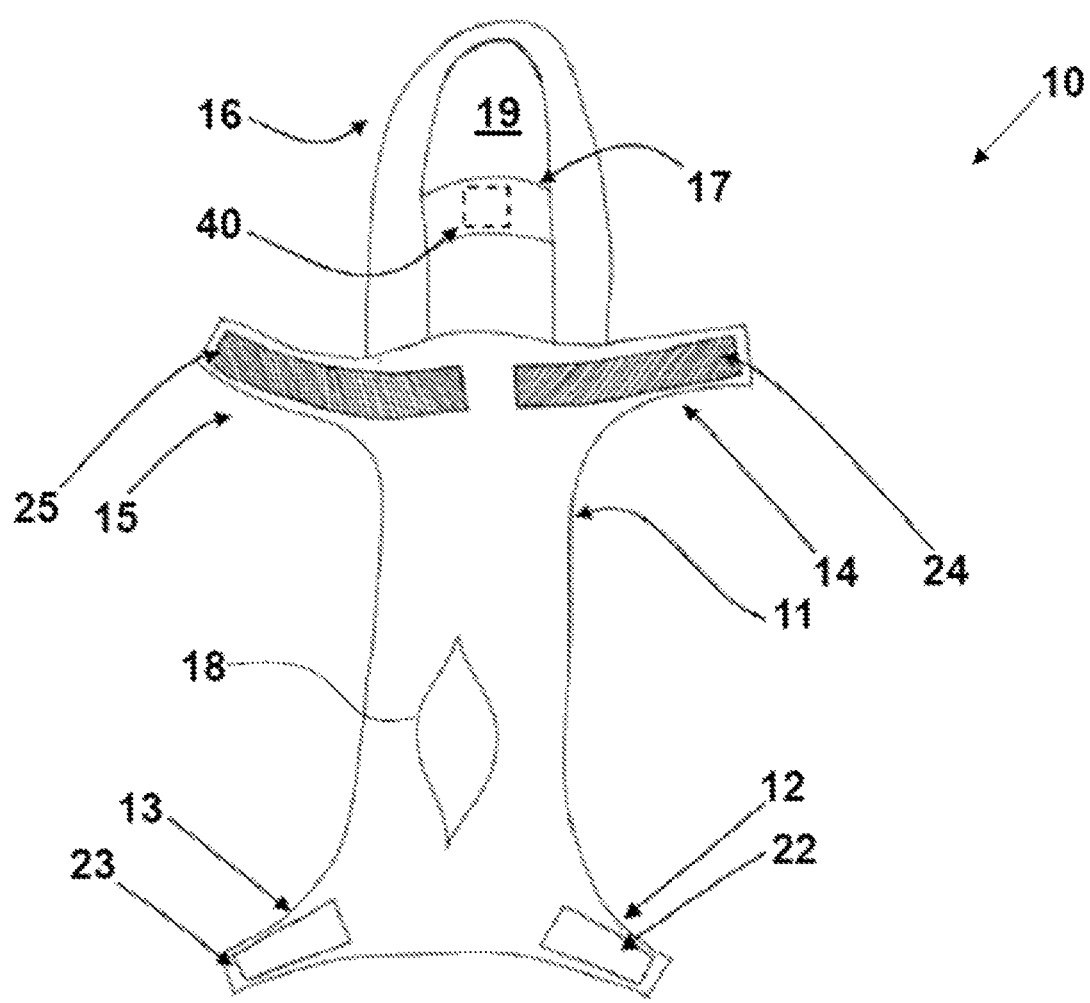
FIG. 1 is a plan view of an exemplary embodiment of a feline diaper assembly of a wearable feline waste collector.

As required, detailed embodiments of the systems, apparatuses, and methods are disclosed herein; however, it is to be understood that the disclosed embodiments are merely exemplary of the systems, apparatuses, and methods, which can be embodied in various forms. Therefore, specific structural and functional details disclosed herein are not to be interpreted as limiting, but merely as a basis for the claims and as a representative basis for teaching one skilled in the art to variously employ the systems, apparatuses, and methods in virtually any appropriately detailed structure. Further, the terms and phrases used herein are not intended to be limiting; but rather, to provide an understandable description of the systems, apparatuses, and methods. While the specification concludes with claims defining the features of the systems, apparatuses, and methods that are regarded as novel, it is believed that the systems, apparatuses, and methods will be better understood from a consideration of the following description in conjunction with the drawing figures, in which like reference numerals are carried forward.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Alternate embodiments may be devised without departing from the spirit or the scope of the invention. Additionally, well-known elements of exemplary embodiments of the systems, apparatuses, and methods will not be described in detail or will be omitted so as not to obscure the relevant details of the systems, apparatuses, and methods.

Before the systems, apparatuses, and methods are disclosed and described, it is to be understood that the terminology used herein is for the purpose of describing particular embodiments only and is not intended to be limiting. The terms "comprises," "comprising," or any other variation thereof are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element. The terms "including" and/or "having," as used herein, are defined as comprising (i.e., open language). The terms "a" or "an", as used herein, are defined as one or more than one. The term "plurality," as used herein, is defined as two or more than two. The term "another," as used herein, is defined as at least a second or more. The description may use the terms "embodiment" or "embodiments," which may each refer to one or more of the same or different embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact (e.g., directly coupled). However, "coupled" may also mean that two or more elements are not in direct contact with each other, but yet still cooperate or interact with each other (e.g., indirectly coupled).

For the purposes of the description, a phrase in the form "A/B" or in the form "A and/or B" or in the form "at least one of A and B" means (A), (B), or (A and B), where A and B are variables indicating a particular object or attribute. When used, this phrase is intended to and is hereby defined as a choice of A or B or both A and B, which is similar to the phrase "and/or". Where more than two variables are present in such a phrase, this phrase is hereby defined as including only one of the variables, any one of the variables, any combination of any of the variables, and all of the variables, for example, a phrase in the form "at least one of A, B, and C" means (A), (B), (C), (A and B), (A and C), (B and C), or (A, B and C).

Relational terms such as first and second, top and bottom, and the like may be used solely to distinguish one entity or action from another entity or action without necessarily requiring or implying any actual such relationship or order between such entities or actions. The description may use perspective-based descriptions such as up/down, back/front, top/bottom, and proximal/distal. Such descriptions are merely used to facilitate the discussion and are not intended to restrict the application of disclosed embodiments. Various operations may be described as multiple discrete operations in turn, in a manner that may be helpful in understanding embodiments; however, the order of description should not be construed to imply that these operations are order dependent.

As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. As used herein, the terms "substantial" and "substantially" means, when comparing various parts to one another, that the parts being compared are equal to or are so close enough in dimension that one skill in the art would consider the same. Substantial and substantially, as used herein, are not limited to a single dimension and specifically include a range of values for those parts being compared. The range of values, both above and below (e.g., "+/−" or greater/lesser or larger/smaller), includes a variance that one skilled in the art would know to be a reasonable tolerance for the parts mentioned.

Herein various embodiments of the systems, apparatuses, and methods are described. In many of the different embodiments, features are similar. Therefore, to avoid redundancy, repetitive description of these similar features may not be made in some circumstances. It shall be understood, however, that description of a first-appearing feature applies to the later described similar feature and each respective description, therefore, is to be incorporated therein without such repetition.

Figure 2:
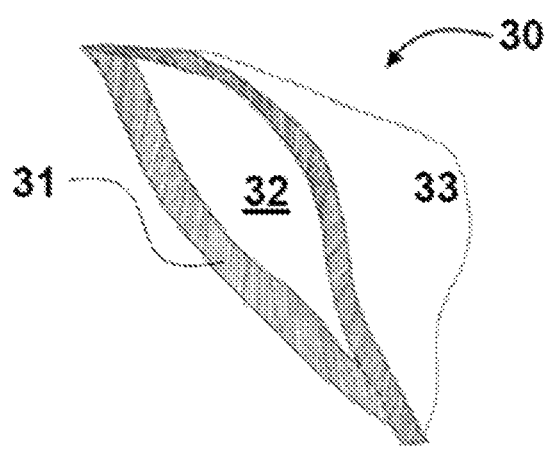
FIG. 2 is a perspective view of an exemplary embodiment of a feline diaper pouch for the diaper assembly and wearable feline waste collector of FIG. 1.

Described now are exemplary embodiments. Referring now to the figures of the drawings in detail and first, particularly to FIGS. 1 and 2, there is shown a first exemplary embodiment of a feline diaper assembly 10 in the form of a garment or harness comprising a central body portion 11 having left and right lower girth straps 12, 13, left and right upper girth straps 14, 15, a neck strap 16, and a collar strap 17. When the exemplary embodiment is worn, the body portion 11 extends over and follows the spine over the back of the feline 1 from adjacent the rear of the neck to the tail. The lower girth straps 12, 13 are at a rear portion of the body portion 11 and the upper girth straps 14, 15 are at a front portion thereof. The body portion 11 defines a diaper opening 18 into which a removable feline diaper 30 releasably connects. The diaper opening 18 is positioned and shaped to receive therethrough a feline's tail and at least accommodate the tail, the anus, and the urinary outlet of the feline. The diaper opening 18 receives and removably connects to the feline diaper 30 (described in further detail below). When so connected, the entry aperture 31 of the feline diaper 30 surrounds both the anus and the respective urinary opening of the feline 1 and forms the opening into an interior, waste-receiving pocket 32 having a bottom 33. When the diaper 30 is attached to the diaper opening 18, the bottom 33 of the diaper 30 is lower than a nadir 20 of the body portion 11 when worn. Put another way, when the assembly 10 and diaper 30 are placed on a feline, the bottom 33 of the diaper 30 has a point lower than either the anus or the urinary opening, thereby facilitating removal and separation of waste from the feline.

Figure 3:
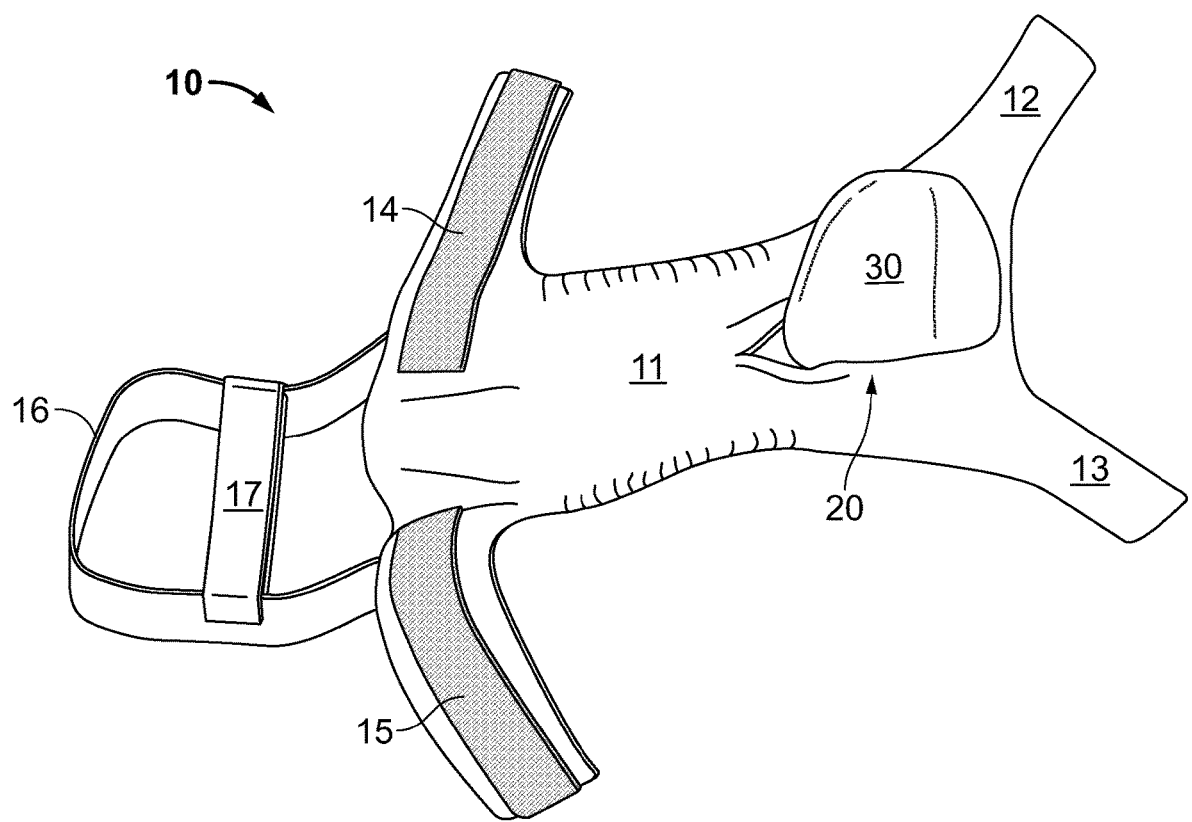
FIG. 3 is a perspective view of an exemplary embodiment of a feline diaper assembly and a diaper pouch connected together.
Figure 4:
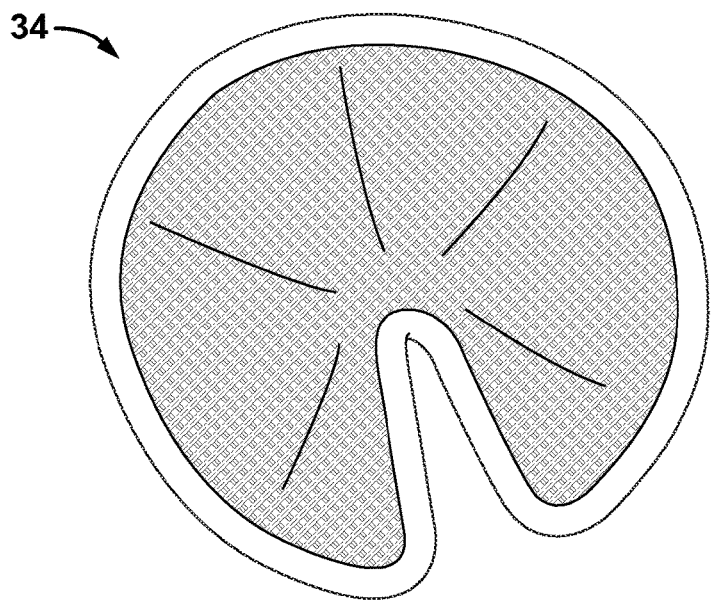
FIG. 4 is a perspective view of an exemplary embodiment of a feline diaper insert in an open orientation.
Figure 5:
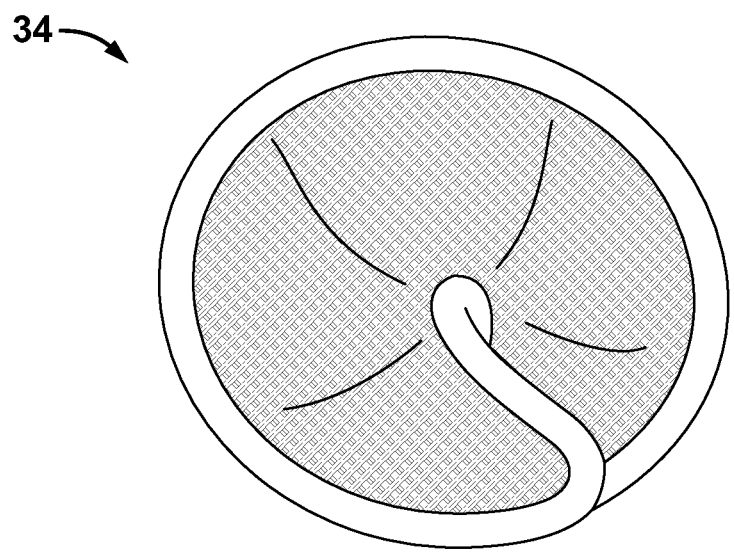
FIG. 5 is a perspective view of the feline diaper insert of FIG. 7 in a closed orientation.

FIG. 3 shows the feline diaper 30 attached to the feline diaper assembly 10. In this exemplary embodiment, an inner, heat-sealed, vinyl pouch attaches within the fabric diaper 30 using hook-and-loop fasteners almost about the full circumference of the diaper opening 18 except for around the area of the feline's tail. The outer fabric pouch of the diaper 30 attaches to the outside of a fabric diaper body portion 11 also with hook-and-loop fasteners to the outside of the vinyl inner pouch. In an alternative exemplary embodiment, all three of these pieces could be fastened together permanently (e.g., sewn) and, therefore, laundered as single unit. In another exemplary embodiment, the outer pouch is permanently attached to the body portion 11 (e.g., heat-sealed and/or sewn) and the inner pouch liner or diaper insert 34 is removable and laundered separately from the diaper assembly 10. An exemplary embodiment of the diaper insert 34 is illustrated in FIGS. 4 and 5. The diaper insert 34 in these figures is, in an open orientation (FIG. 4) a flat, washable, removable pad of a waterproof material that traps and retains feline waste. Exemplary materials for the diaper insert 34 or the interior surface of the insert includes, but is not limited to, Zorb® Organic Cotton Dimple Waterproof CORE Eco-PUL™ Soaker Fabric that is treated with the SILVADUR® Antimicrobial to inhibit the growth of bacteria, fungi and algae and control bad odors. FIG. 5 shows the diaper insert 34 in a closed orientation, e.g., in a conical shape, that, when inserted into the diaper 30, catches all waste and prevents the waste from exiting the diaper 30. In a further exemplary embodiment, the outer and inner pouches are integral (e.g., sewn) and, together, they removably attach to the body portion 11. In this embodiment, the inner and outer pouches are a single removable, replaceable unit.

Figure 6:
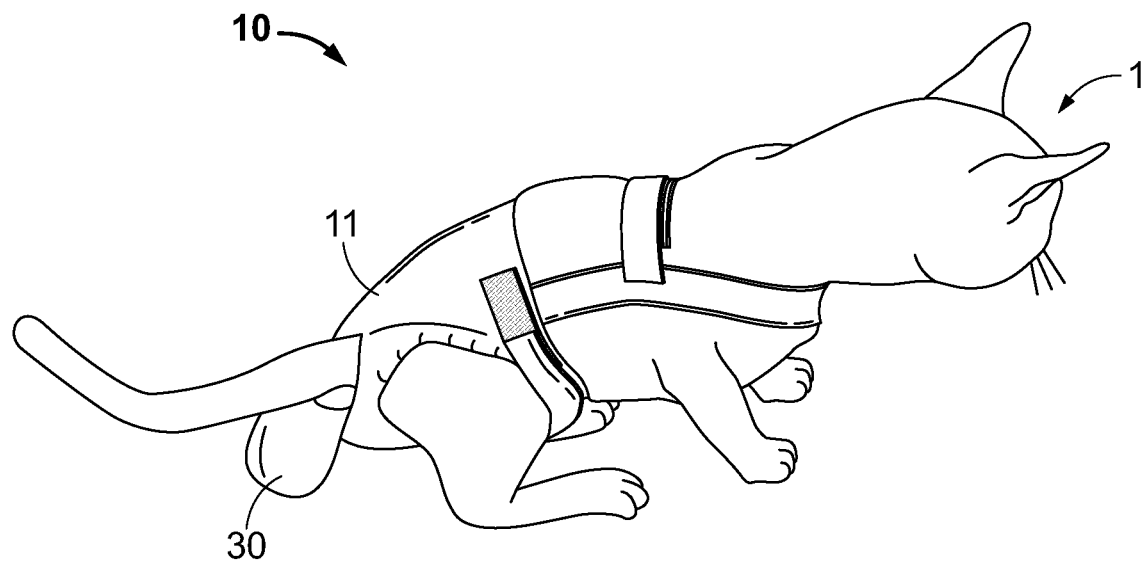
FIG. 6 is a perspective view of the exemplary wearable feline waste collector with the feline diaper assembly of FIG. 1 and the diaper pouch of FIG. 2 fitted on a feline in a sitting position.
Figure 7:
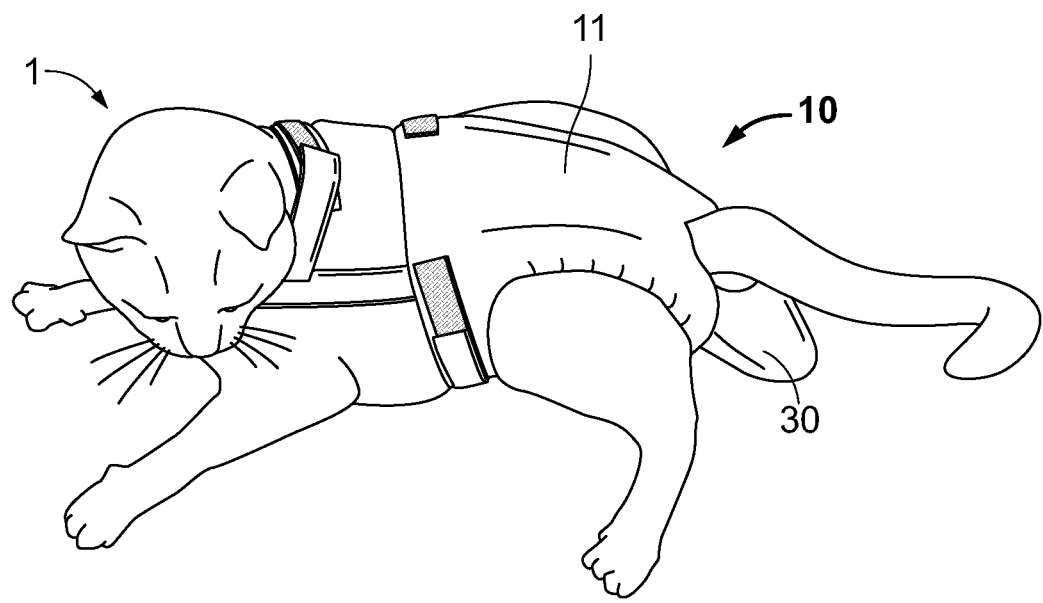
FIG. 7 a perspective view of the exemplary wearable feline waste collector with the feline diaper assembly of FIG. 1 and the diaper pouch of FIG. 2 fitted on a feline in a laying down position.
Figure 8:
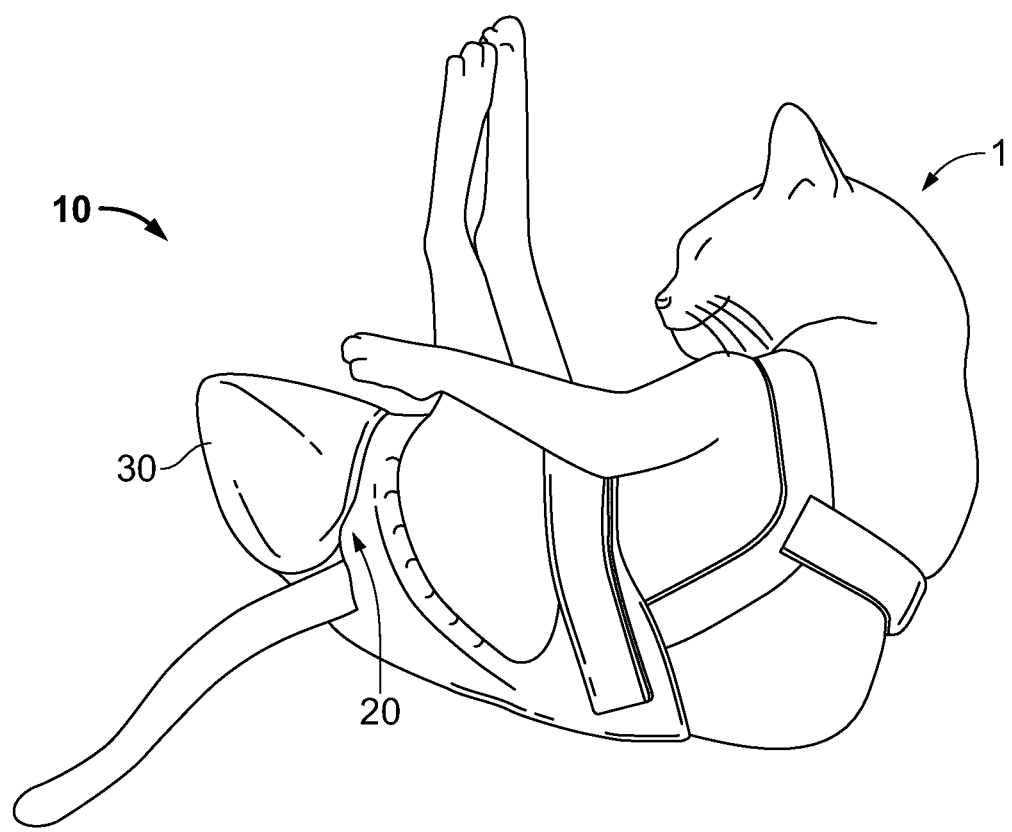
FIG. 8 is a perspective view of the exemplary wearable feline waste collector with the feline diaper assembly of FIG. 1 and the diaper pouch of FIG. 2 fitted on a feline in a side-laying position.

With the feline diaper assembly 10 securely attached to the feline's torso, the feline diaper 30 is in a position to receive both urine and feces through the entry aperture 31 in any position that the feline 1 may take, with one exception: when the feline 1 sits upright, as in FIG. 6, or lays down, as in FIG. 7, the position where the area of the anus rests against the ground causes the feline diaper 30 to fold and compress to close the aperture 31. Thus, when in this upright sitting position, any urine or feces present within the feline diaper 30 has material of the feline diaper 30 disposed between the waste and the fur/skin of the feline 1. Thus, any waste in the feline diaper 30 substantially rests away from the fur/skin of the feline 1. FIG. 8 shows the feline 1 laying on its side with the diaper 30 in the shape of the insert of FIG. 5. When the feline 1 is on her/his feet as shown in FIG. 9, the shape of the feline diaper 30, having the bottom 33 lower than the lowest point of the entry aperture 31, causes gravity to move any feces or urine into the bottom 33 of the pocket 32, again keeping the waste substances away from the fur/skin of the feline 1.

The left and right lower girth straps 12, 13 have respective lower girth fasteners 22, 23 and the left and right upper girth straps 14, 15 have respective upper girth fasteners 24, 25. In the exemplary embodiment shown in FIG. 1, the fasteners 22, 23, 24, 25 are corresponding parts of hook and loop fabrics, sometimes referred to under the trade name VELCRO®. Other fasteners performing the same removable or openable function are equally applicable and include, but are not limited to, snaps, buttons, zippers, clips, stretch cords and fabrics, and/or bungees. In the exemplary embodiment, there are a pair of lower girth straps and a pair of upper girth straps. However, in alternative embodiments, there can be one lower girth strap and one upper girth strap (e.g., each strap is longer than the first exemplary embodiment to wrap around the belly of the feline). Alternatively, there can be only one belly strap (not illustrated) that extends from below/rear of the diaper opening 18 and extends in a V-shape to secure on both lateral sides of the feline from below.

Figure 9:
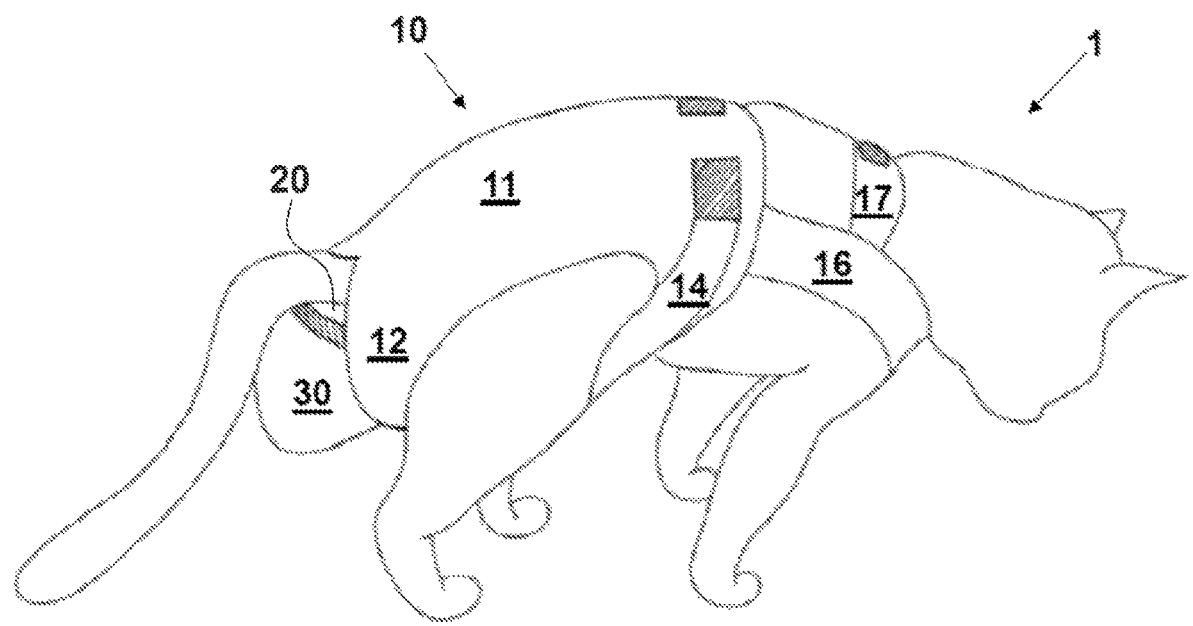
FIG. 9 is a perspective view of the exemplary wearable feline waste collector with the feline diaper assembly of FIG. 1 and the diaper pouch of FIG. 2 fitted on a feline in a standing position.

To place the feline diaper assembly 10 on a feline 1, as shown in FIG. 9, the feline's head 2 is inserted through a neck opening 19 that is formed by the neck strap 16 and the collar strap 17. The feline's tail is then inserted through the diaper opening 18. A feline identifier 40 can be placed anywhere on the assembly 10. An advantageous position is on the outside surface of the collar strap 17, which places the identifier 40 behind the back of the feline's neck. The right and left lower and upper girth straps 12, 13, 14, 15 are extended around the feline's body to make respective connections that retain the assembly 10 on the feline 1 until the user wants to remove the assembly 10 from the feline. In particular, the right girth strap 12 is extended around the rear of the right leg and under the right rear leg in a direction from the rear belly towards the back of the feline. The right upper girth strap 14 is extended from the back of the feline towards the right girth strap 12 to place the right lower girth fastener 22 and the right upper girth fastener 24 together. Similarly, the left girth strap 13 is extended around the rear of the left leg and under the left rear leg in a direction from the rear belly towards the back of the feline. The left upper girth strap 15 is extended from the back of the feline towards the left lower girth strap 13 to place the left lower girth fastener 23 and the left upper girth fastener 25 together. This configuration makes it very difficult for the feline 1 to separate any of the fastener pairs 22, 24; 23, 25 from one another.

In another exemplary configuration, the right and left lower and upper girth straps 12, 13, 14, 15 are extended around the feline's body to make respective connections that retain the assembly 10 on the feline 1 until the user wants to remove the assembly 10 from the feline. In particular, the right girth strap 12 is extended around the front of the right rear leg and under the right rear leg in a direction from the right to the left. The left girth strap 13 is extended around the front of the left rear leg and under the left rear leg in a direction from the left to the right to place the right lower girth fastener 22 and the left lower girth fastener 23 together. The right upper girth strap 14 is extended from the back of the feline around the rear of the right front leg and under the right front leg in a direction from the right to the left. The left upper girth strap 15 is extended from the back of the feline around the rear of the left front leg under the left front leg in a direction from the left to the right to place the right upper girth fastener 24 and the left upper girth fastener 25 together.

In alternative connection possibilities, the right girth strap 12 is extended around the rear of the right leg and under the tail and the left girth strap 12 is extended around the front of the left leg and under the left leg to place the right lower girth fastener 22 and the left lower girth fastener 23 together, and vice versa.

In further alternative connection possibilities, the right upper girth strap 14 is extended around the front of the right leg and the left upper girth strap 15 is extended around the rear of the left leg and under the left leg to place the right upper girth fastener 24 and the left upper girth fastener 25 together, and vice versa.

In yet further alternative connection possibilities, the right lower girth strap 12 is extended around the front of the right rear leg and under the right rear leg in a direction from the right forward towards the left. The left upper girth strap 15 is extended from the back of the feline around the rear of the left front leg and under the left front leg in a direction from the left rearward to the right rear to place the right lower girth fastener 22 and the left upper girth fastener 25 together. Likewise, the left lower girth strap 13 is extended around the front of the left rear leg and under the left rear leg in a direction from the left forward towards the right. The right upper girth strap 14 is extended from the back of the feline around the rear of the right front leg and under the right front leg in a direction from the right rearward to the left to place the left lower girth fastener 23 and the right upper girth fastener 24 together, thereby crossing the various straps in an X-shape below the feline's belly.

The feline diaper assembly 10 and diaper 30 solves the problem of indoor cats that refuse to use a litter box. The diaper 30 contains and retains both urine and feces for male and female felines until the user of the assembly 10 and diaper 30 removes the diaper 30.

One exemplary embodiment for attaching the diaper 30 to the assembly 10 is through the diaper opening 18 with the pouch 32, 33 facing outward and away from the feline 1. The diaper opening 18 is attached to the diaper 30 (e.g., made of a water-tight fabric or having a water-tight liner with any exterior fabric) in a way that seals the pouch against the fabric but leaves space for the feline's tail and so that the extending portion of the pouch 32, 33 sits under the feline's tail, away from the feline's body. In an advantageous connection, the entry aperture 31 of the diaper 30 has one part of a hook-and-loop fastener and the diaper opening 18 has the other part of the hook-and-loop fastener. Other fasteners are equally applicable as indicated herein.

Any of the straps 12, 13, 14, 15 can be adjustable in length to remove any slack in the harness when worn.

The pouch formed by the feline diaper 30 can accommodate a variety of removable, absorbent materials to soak up urine and to prevent leaks. Example materials include, but are not limited to, cotton, paper, gels (e.g., Sodium Polyacrylate), and woven fabrics.

It is noted that various individual features of the inventive processes and systems may be described only in one exemplary embodiment herein. The particular choice for description herein with regard to a single exemplary embodiment is not to be taken as a limitation that the particular feature is only applicable to the embodiment in which it is described. All features described herein are equally applicable to, additive, or interchangeable with any or all of the other exemplary embodiments described herein and in any combination or grouping or arrangement. In particular, use of a single reference numeral herein to illustrate, define, or describe a particular feature does not mean that the feature cannot be associated or equated to another feature in another drawing figure or description. Further, where two or more reference numerals are used in the figures or in the drawings, this should not be construed as being limited to only those embodiments or features, they are equally applicable to similar features or not a reference numeral is used or another reference numeral is omitted.

The foregoing description and accompanying drawings illustrate the principles, exemplary embodiments, and modes of operation of the systems, apparatuses, and methods. However, the systems, apparatuses, and methods should not be construed as being limited to the particular embodiments discussed above. Additional variations of the embodiments discussed above will be appreciated by those skilled in the art and the above-described embodiments should be regarded as illustrative rather than restrictive. Accordingly, it should be appreciated that variations to those embodiments can be made by those skilled in the art without departing from the scope of the systems, apparatuses, and methods as defined by the following claims.

What is claimed is:

1. A wearable feline waste collector for a feline having a chin, a back, a tail, an anus, rear legs, front legs, a belly, and a urinary outlet, the waste collector comprising:
    a feline diaper assembly comprising:
        a flexible, rectangular, planar body portion comprising:
            a front having right and left areas;
            a rear;
            a length;
            a width substantially constant from the front to the rear along the length;
            a middle having an underside and comprising an at least partly annular tail area defining a single diaper opening sized to at least accommodate and surround the tail, the anus, and the urinary outlet when worn;
        right and left lower girth straps projecting away from the rear of the planar body portion in a T-shape, the right and left lower girth straps having respective right and left lower girth strap fasteners; and
        right and left upper girth straps projecting away from the front of the planar body portion in a T-shape, the right and left upper girth straps having respective right and left upper girth fasteners, the right lower girth strap fastener being configured to attach removably at least to the right upper girth fastener to form a first pair connection and the left girth lower strap fastener being configured to attach removably at least to the left upper girth fastener to define a second pair connection;

a single U-shaped collar strap comprising right and left lateral strap portions each respectively connected to the right and left areas of the front of the planar body portion and sized to extend from the back of the feline and under and around the chin of the feline when worn, wherein:
a connected state of the first pair connection and the second pair connection removably secures the lower girth straps and the upper girth straps respectively around the right and left rear legs of the feline in an assembly-secured state; and
in the assembly-secured state:
the length extends longitudinally from the rear at the belly of the feline to the front at the back of the feline; and
the width extends:
at the front of the planar body portion, laterally at a longitudinal point at the back of the feline between the rear legs and the front legs; and
at the rear of the planar body portion, laterally across the belly of the feline between the rear legs and the front legs to fill and cover a space between the rear legs of the feline from the back of the feline to the belly of the feline and completely surround the tail, the anus, and the urinary outlet such that an area defined longitudinally from between the right and left upper girth straps all the way to between the right and left lower girth straps is filled by the planar body portion having the single diaper opening; and
a single pouch removably connected to the single diaper opening to contain both urine and feces when worn.

2. A wearable feline waste collector for a feline having a back, a chin, rear legs, front legs, an anus, a urinary outlet, a belly, and a tail, the waste collector comprising:
a feline diaper pouch comprising an entry aperture and an interior pocket having a pouch bottom; and
a feline diaper assembly comprising:
a U-shaped collar strap shaped and sized to wrap under and around the chin of the feline from the back of the feline when worn and defining right and left lateral portions;
a flexible, rectangular, planar body portion comprising:
a front connected to the right and left lateral portions;
a rear;
a length;
a width substantially constant from the front to the rear along the length; and
a middle defining a single opening:
at a position between the rear legs of the feline to surround the tail, the anus, and the urinary outlet when worn;
configured to removably attach to the feline diaper pouch beneath the tail; and
having a nadir;
right and left girth straps projecting from the rear of the planar body portion in a T-shape, the right and left girth straps sized to wrap around a respective one of the rear legs of the feline and removably secure to the planar body portion at respective securing sites of the planar body portion in a secured state and, in the secured state:
the length extends longitudinally from the rear at the belly of the feline to the front at the back of the feline; and
the width extends:
at the front of the planar body portion, laterally at a longitudinal point at the back of the feline between the rear legs and the front legs; and
at the rear of the planar body portion, laterally across the belly of the feline between the rear legs and the front legs to fill and cover an area defined longitudinally from between the right and left girth straps on the planar body portion to a line between the securing sites except for the single opening; and
the feline diaper pouch attached at the opening such that, responsive to the feline diaper pouch being attached to the opening and the assembly being worn by the feline, the pouch bottom is lower to ground than the nadir.

3. The feline waste collector according to claim 1, which further comprises an adjustable across-the-shoulder strap extending from the right lateral strap portion to the left lateral strap portion and configured to adjust a distance between the left and right lateral strap portions behind a head of the feline when worn.

4. The feline waste collector according to claim 2, wherein the right and left girth straps comprise right and left lower girth straps, and further comprising:
right and left upper girth straps projecting away from the front of the planar body portion and having respective right and left upper girth fasteners, the right and left lower girth straps each having a lower girth fastener configured to removably secure to one of the right and left upper girth fasteners respectively around the right and left rear legs of the feline; and
an adjustable across-the-shoulder strap extending between the right and left lateral portions of the collar and configured to adjust a width between the right and left lateral portions, the adjustable across-the-shoulder strap comprising two parts removably securable to one another.

5. The feline waste collector according to claim 4, wherein the removable securement between each of the right and left lower girth fasteners to the right and left upper girth fasteners is a hook-and-loop fastener.

6. The feline waste collector according to claim 4, wherein each of the right and left lower girth straps projects laterally from the rear of the planar body portion.

7. The feline waste collector according to claim 2, wherein the feline diaper pouch is one of:
removable from the planar body portion; and
integral with the planar body portion.

8. The feline waste collector according to claim 7, wherein the feline diaper pouch comprises a removable, watertight, inner pouch shaped to receive and retain feline waste.

9. The feline waste collector according to claim 2, wherein the right and left girth straps comprise two pairs of girth straps, a first of the pairs being a front right portion and a rear right portion and a second of the pairs being a front left portion and a rear left portion, the front right portion configured to extend clockwise around the feline's right rear leg and the rear right portion configured to extend counter-clockwise around the feline's right rear leg, the front left portion configured to extend counter-clockwise around the feline's left rear leg and the rear left portion configured to extend clockwise around the feline's left rear leg.

10. The feline waste collector according to claim 2, wherein the feline diaper pouch is removably secured to the single opening.

11. The feline waste collector according to claim 2, wherein the single opening is positioned and shaped to receive therethrough the feline's tail and at least accommodate the tail, the anus, and the urinary outlet of the feline.

12. The feline waste collector according to claim 2, wherein the feline diaper pouch has a watertight interior.

13. The feline waste collector according to claim 2, wherein the feline diaper pouch comprises a material selected from at least one of textile, washable fabric, leather, nylon, a polymer, polymers, laminated PUL, polyester, vinyl, and cotton.

14. The feline waste collector according to claim 2, wherein the feline diaper pouch is at least partly filled with a liquid absorbing material.

15. The feline waste collector according to claim 14, wherein the liquid absorbing material is an odor-absorbing material.

16. The feline waste collector according to claim 14, wherein the liquid absorbing material is selected from at least one of cotton, paper, gel, Sodium Polyacrylate, and a woven fabric.

17. The feline waste collector according to claim 2, wherein the feline diaper pouch defines an entry aperture that, together with the interior pocket, are shaped to compress into a closed state responsive to the feline assuming a laying or sitting down position, the closed state substantially preventing interior waste from exiting the entry aperture.

18. A wearable feline waste collector for a feline having a chin, a back, rear legs, front legs, a tail, an anus, a belly, and a urinary outlet, the waste collector comprising:
a pouch having left and right lateral pouch portions; and
a feline diaper harness comprising:
a flexible, rectangular, planar body portion comprising:
a front;
a rear;
a length;
a width substantially constant from the front to the rear along the length; and
a middle defining a single opening sized to at least accommodate the tail, the anus, and the urinary outlet of the feline, the single opening defining a left side, a right side, an underside, and a nadir;
a U-shaped collar strap shaped to wrap under and around the chin of the feline from the back of the feline and defining right and left lateral portions;
right and left lower girth straps projecting away from the rear in a T-shape, the right and left lower girth straps having respective right and left lower girth strap fasteners; and
right and left upper girth straps projecting away from the front of the planar body portion in a T-shape, the right and left upper girth straps having respective right and left upper girth strap fasteners, the right lower girth strap fastener being configured to attach removably at least to the right upper girth strap fastener and the left lower girth strap fastener being configured to attach removably at least to the left upper girth strap fastener to removably secure the girth straps respectively around the right and left rear legs of the feline,
wherein, when worn:
the length extends longitudinally from the rear at the belly of the feline to the front at the back of the feline; and
the width extends:
at the front of the planar body portion, laterally at a longitudinal point at the back of the feline between the rear legs and the front legs; and
at the rear of the planar body portion, laterally across the belly of the feline between the rear legs and the front legs to fill and cover a space between the rear legs of the feline from the back of the feline to the belly of the feline and completely surround the tail, the anus, and the urinary outlet of the feline such that an area defined longitudinally from between the right and left upper girth straps all the way to between the right and left lower girth straps is filled by the planar body portion having the single diaper opening; and
the left and right lateral pouch portions are removably secured to the left side, the right side, and the underside of the single opening beneath the tail of the feline; and
the pouch has an interior bottom that, responsive to the diaper being attached to the single opening, the interior bottom is lower to ground than the nadir.

19. The feline waste collector according to claim 18, wherein the pouch comprises:
an outer pouch; and
a removable, watertight, inner pouch:
disposed in the outer pouch and shaped to receive and retain feline waste therein; and
at least partly filled with a liquid absorbing material.

20. The feline waste collector according to claim 18, wherein the pouch defines an entry aperture and is shaped to compress into a closed state responsive to the feline assuming a laying or sitting down position, the closed state substantially preventing interior waste from exiting the entry aperture.

* * * * *